April 15, 1969

K. ROLL 3,438,255

LIQUID-LEVEL GAUGE

Filed April 17, 1967

INVENTOR
KARL ROLL

BY *Karl F. Ross*

ATTORNEY

United States Patent Office 3,438,255
Patented Apr. 15, 1969

3,438,255
LIQUID-LEVEL GAUGE
Karl Roll, Leinfelden, Germany, assignor to Walter Beck K.G., Kontroll- und Fernmessgerate, Stuttgart-Mohringen, Germany
Filed Apr. 17, 1967, Ser. No. 631,491
Claims priority, application Germany, Apr. 20, 1966, B 86,752
Int. Cl. G01f 23/14
U.S. Cl. 73—299
20 Claims

ABSTRACT OF THE DISCLOSURE

A liquid-level gauge containing a pressure cell, the movements of which are transmitted to the pointer by means of a lever which, in turn, acts upon a rocker of sheet metal and a crank-shaped cross section, one end of which may also form the pointer.

BACKGROUND OF THE INVENTION

The present invention relates to a liquid-level gauge which comprises a capsule diaphragm or pressure cell which, by means of a lever or the like and further transmitting means, acts upon an indicating device and is, in turn, acted upon exteriorly by atmospheric pressure or the pressure within a completely closed chamber, while its inside is connected to an immersion tube extending to the bottom of a container holding the liquid to be measured and responds through this tube and the air cushion therein to the hydrostatic pressure which depends upon the particular level of the liquid in the container.

An instrument of the type as above described has been disclosed in the U.S. Patent No. 3,290,939. In order to facilitate the assembly of this instrument, the transmitting means thereof which are provided between the pressure cell and the indicating device are mounted on a common intermediate supporting plate. One of these transmitting means is designed in the form of a two-armed angular lever which is pivotable about an axis extending at right angles to the axis of the pressure cell and one arm of which engages upon the pressure cell, while its other arm acts by means of a chain or the like and against the action of a spring upon a shaft which is rotatable in sleeve bearings and carries a pointer.

Although this gauge construction has the advantage over other gauges of this type which were previously developed by permitting it to be more easily and quickly assembled, it still comprises a relatively large number of elements which not only entail a high cost of production but also result in considerable frictional losses.

SUMMARY OF THE INVENTION

It is an object of the present invention to provide a liquid-level gauge of the type as first described which is composed of an extremely small number of separate elements and the operation of which only entails such small frictional losses that they may be disregarded and have no effect upon the accuracy of the parameters which are measured by the gauge.

For attaining this object, the invention provides that the transmitting means between the lever which is actuated by the pressure cell and the indicating device consists of a rocker which is acted upon at one side by the mentioned lever and at the other side by a return spring. According to the invention, it is also possible to make the pointer which forms a part of the indicating device and extends at right angles to the pivot axis of the rocker an integral part of the rocker.

An important feature of the invention consists in providing the rocker in the cross-sectional shape of a crankshaft, wherein the outer end portions of the rocker form the axis of rotation and thus the pivots of the crankshaftlike rocker, while one of the two crank parts which are offset in opposite directions from this axis serves as a bearing for pivotably connecting thereto the lever which is actuated by the pressure cell and the other crank part serves as a connecting point for the return spring.

For effecting a zero adjustment of the pointer of the instrument and for also adapting the transmission ratio of the cell-controlled lever and pointer and thus also the characteristic of the pressure cell to the graduations on the dial, one of the pivot points of the lever is preferably provided on the free end of a resilient supporting element which may be adjusted in two different directions by two separate adjusting means. This resilient supporting element may be provided in the form of a leaf spring which is bent to a U or V shape and has one arm the end of which is rigidly secured to the gauge housing, while the end of the other arm serves as a pivot bearing for the mentioned lever.

The adjusting means for this leaf spring preferably consists of a pair of setscrews, the first of which acts tangentially upon the outer surface of the spring arm the end of which is rigidly secured to the gauge housing, while the other setscrew supports the free end of the other arm of the leaf spring. When the first setscrew which acts tangentially upon the leaf spring is turned in one direction or the other, the pivot bearing of the lever on the free end of the spring will be shifted laterally so as to permit a zero adjustment of the pointer to be effected, while when the other setscrew is turned, the mentioned pivot bearing for the lever on the free end of the leaf spring will be raised or lowered so as to vary the transmission ratio of the lever.

These and further features and advantages of the present invention will become more clearly apparent from the following detailed description thereof which is to be read with reference to the accompanying drawing, in which—

FIGURE 4 shows, partly broken away, a top view of the gauge; while

Figure 1:
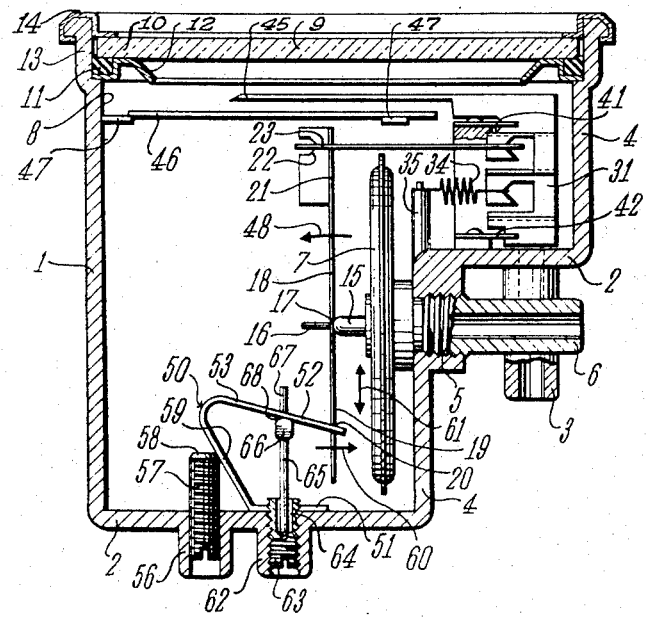
FIGURE 1 shows a longitudinal section of the gauge according to the invention.

As illustrated particularly in FIGURE 1, the gauge according to the invention comprises a cup-shaped housing 1 which is open at its upper end and has a step-shaped bottom 2 the upper part of which carries a connection fitting 3 which may connect the inside of the gauge housing 1 either with the atmosphere or with a sealed container containing air under a certain pressure. The lower part of the step-shaped side wall 4 of the housing is further provided with a tapped bore 5 through which another connection fitting 6 of a pressure cell 7 is screwed by means of a corresponding male thread so that the axis of this cell extends at a right angle to the longitudinal axis of the housing 1. This fitting 6 may be connected to an immersion tube which may be inserted into the container holding the liquid the level of which is to be measured.

The upper opening 8 of housing 1 is covered by a glass plate 9 the outer edge 10 of which seats against a flat gasket ring 11 which is inserted from above into the opening 8 and also holds a masking ring 12 in a fixed position. The upper edge 13 of the gauge housing is gripped by a locking ring 14 which presses the glass plate 9 tightly upon the gasket ring 11 and thus seals the inside of the housing hermetically against the exterior.

The pressure cell 7 is provided with an axially extending tappet 15 which carries on its free end a thin pin 16 and an intermediate annular flange 17 which is spherically curved. This flange 17 on the tappet 15 serves as a bearing for supporting a two-armed lever 18 of sheet metal, one arm 19 of which engages an adjustable pivot bearing 20, while the end of its other arm 21 is provided with a knife-edge bearing 22. This lever 18, which through the tappet 15 is movable in accordance with an expansion or contraction of the pressure cell 7, rests on the spherical surface of flange 17 so as to be freely pivotable in all directions and it is held in each position on this flange by the pin 16 passing through a bore in lever 18.

Figure 3:
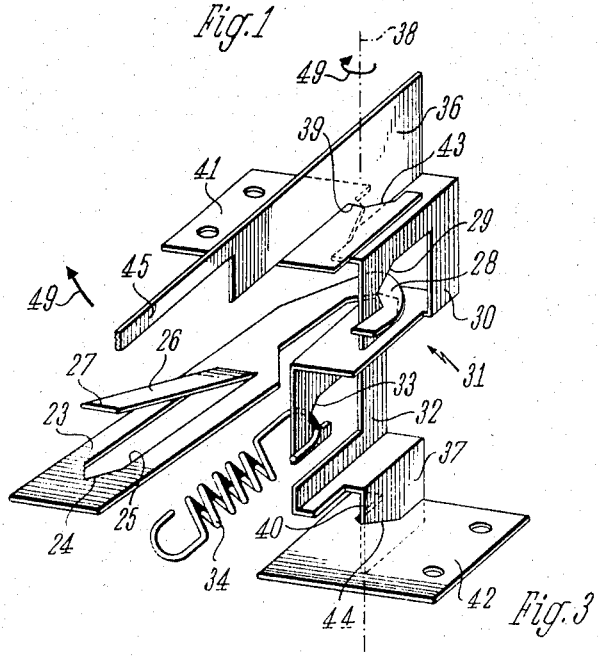
FIGURE 3 shows a perspective view of the rocker and pointer mechanism.
Figure 4:
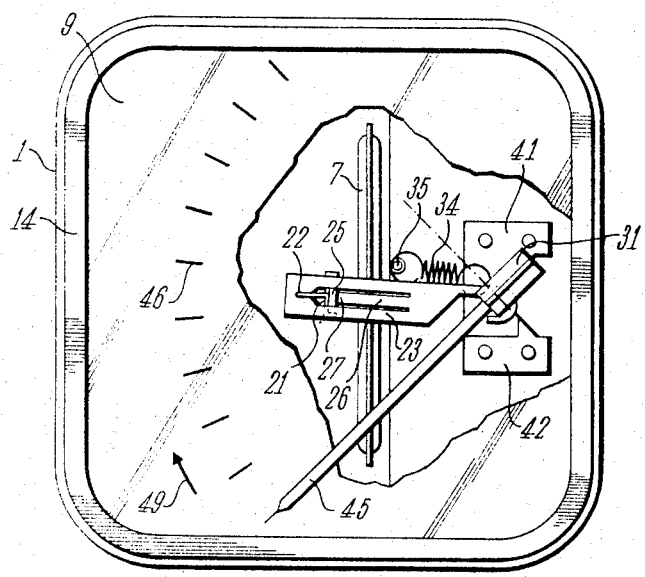

As illustrated in FIGURES 1 and 4, the knife-edge bearing 22 on the end 21 of lever 18 supports one end of a draw bar 23 which is likewise made of sheet metal and the other end of which is also provided with a knife-edge bearing 24 (FIG. 3). Since the knife edge of each of these two bearings 22 and 24 has an aperture angle of about 90° and since they extend at right angles to each other, the contact surfaces of these two knife edges 22 and 24 are very small and the friction produced by them is therefore also very low. As may be seen in FIGURE 3, the knife-edge bearing 24 on draw bar 23 is formed by stamping out an aperture 25. The tongue 26 which is thereby formed and the free end of which is shortened is then bent upwardly. When the knife-edge bearing 22 on the end of the lever arm 21 is suspended in the knife-edge bearing 24 on draw bar 23 in the manner as illustrated in FIGURES 1 and 4, the shortened tongue 26 may be bent back into the plane of draw bar 23 so that the tongue edge 27 will serve as an abutment for the end of the lever arm 21 and thus prevent the same from slipping out of the remaining part of the aperture 25 in draw bar 23.

Figure 2:
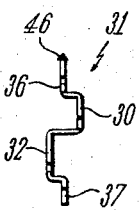
FIGURE 2 shows a diagrammatic front view of the rocker.

The end of draw bar 23 opposite to that containing the aperture 25 is designed so as to form an angular knife-edge bearing 28 which likewise has an aperture angle of about 90°. By means of this bearing 29, draw bar 23 engages in a corresponding angular knife-edge bearing 29 which is provided in a rocker 31 and more particularly in the part 30 thereof which extends at substantially right angles to the draw rod 23. This rocker 31 is stamped from sheet metal just like the lever 18 and the draw rod 23 and has a cross-sectional shape similar to a crank shaft, as illustrated in FIGURE 2, insofar as the part 30 forms one crank and a similar part 32 forms the opposite crank. This part 32 is provided with an angular knife-edge bearing 33 which likewise has an aperture angle of about 90°. This bearing 33 serves as a support of one end of a tension spring 34, the other end of which is hooked into a stationary pin 35 on the housing 1.

The two outer arms 36 and 37 of rocker 31 are bent so as to be disposed exactly within the plane of the pivot axis 38 of the rocker. The upper rocker arm 36 is again provided with a knife-edge bearing 39 which has an aperture angle of about 90°, while the front edge of the lower arm 37 forms a continuous knife edge 40. Rocker 31 is operatively associated with two bearing plates 41 and 42 which are secured in a fixed position on housing 1 and each of which is again provided with a recess forming an angular knife-edge bearing 43 and 44, respectively, which has an aperture angle of about 90°.

Rocker 31 further carries the pointer 45 of the indicating device which, as shown in FIGURE 3, is integral with the upper arm 36 of rocker 31. Consequently, any other transmitting means which would cause additional friction are avoided. This pointer 45 is associated with a graduated dial 46 which is mounted underneath the glass plate 9 on supporting tabs 47 which are secured to the inner wall of housing 1. The pivoting range of rocker 31 and thus also of the pointer 45 is limited by the two edges of the two stationary knife-edge bearings 43 and 44 each of which has an aperture angle of about 90° but may also be larger and amount up to 170°.

The mode of operation of the gauge according to the invention is as follows:

When the container to which the gauge is connected by the fitting 6 is being filled and the tappet 15 of the pressure cell 7 is then moved forwardly by the hydrostatic pressure acting upon the cell, the two-armed lever 18 will carry out a pivoting movement about the pivot point 20 in the direction of the arrow 48, as shown in FIGURE 1. By means of the draw bar 23, the end 21 of lever 18 then exerts such a tension upon the cranked part 30 of rocker 31 that the rocker and thus also the pointer 45 will be turned in the direction of the arrow 49. If due to a reduction of the amount of liquid in the container to which the fitting 6 is connected the hydrostatic pressure decreases which acts upon the pressure cell 7, lever 18 will slowly return to its original position under the action of the return spring 34 and rocker 31 together with pointer 45 will also be equally drawn back by the return spring 34. This insures that the pointer of the gauge will at all times indicate very accurately the prevailing hydrostatic pressure and thus the quantity of the liquid in the container. Since the bearings between the individual elements of the gauge are provided in the form of knife-edge bearings, the frictional losses which might still occur are reduced to an insignificant value which also improves the accuracy of the measured results.

The gauge according to the invention is also very insensitive to shocks and vibrations. Thus, for example, lever 18 is prevented from disengaging from the tappet 15 by the pin 16 projecting through this lever. Furthermore, the return spring 34 as well as the draw bar 23 exert such a tension upon the rocker parts 30 and 32 that the two knife-edge bearings 39 and 40 of rocker 31 will be drawn tightly into the fixed knife-edge bearings 43 and 44. Since the edge 40 on the lower knife-edge bearing 44 also forms a knife edge, the rocker part 37 may shift within the bearing plate 42 to such an extent in the vertical direction that the knife-edge bearing 39 of the upper rocker part 36 will fit properly into the knife-edge bearing 43 of the bearing plate 41 and will thus insure that any deviations in the proper distance between the two bearing plates 41 and 42 will be automatically compensated.

Figure 5:
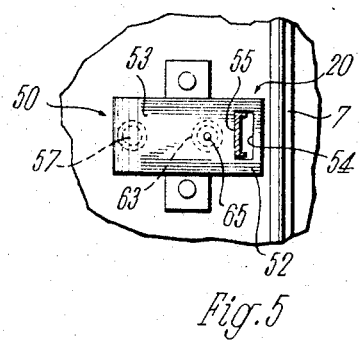
FIGURE 5 shows a top view of the adjusting means of the gauge.

For adjusting the gauge, a U or V-shaped leaf spring 50 is provided. One arm 51 of this spring is secured in a fixed position to the bottom 2 of the gauge housing, while the end 52 of the free arm 52 of the spring serves as a pivot bearing 20 for the end 19 of lever 18. As illustrated in FIGURE 5, the spring arm 53 is for this purpose provided with a rectangular aperture 54 which has knife edge 55 on which the end 19 of the lever is supported which projects through this aperture 54.

In order to adjust this bearing 20 so that the pointer 45 will be in zero position, a setscrew 57 is screwed into a socket 56 on the bottom 2 of the housing so that its inner end 58 engages tangentially upon the resilient arm 59 of spring 60. When this setscrew 57 is tightened, it will press the spring arm 59 toward one side and thereby shift the bearing 20 in the direction of the arrow 60. When setscrew 57 is, however, screwed outwardly, the spring arm 59 and thus also the bearing 20 will move in the direction opposite to the arrow 60.

For adjusting the pressure-cell characteristic to the graduations of the dial, it is, however, necessary to lift or lower the bearing 20 in the direction of the arrow 61 and thereby vary the transmission ratio of the lever 18. This may be accomplished by providing another setscrew 63 which is screwed into a socket 62 adjacent to the socket 56 in the bottom 2 of the housing. This setscrew 63 is provided in its inner end with a socket bore 64 which has a spherical bottom and serves as a bearing of a pin 65 which is thus pivotable in all directions and has near its upper end 67 a flange 66 with a spherical upper surface supporting the free arm 53 of spring 50. Similarly as the pin 16 on tappet 15 projects through the lever 18 for supporting the latter, the free end 67 of pin 65 also projects through the spring arm 53. The annular surface 68 of flange 66 is likewise spherically shaped so as to permit the pin 65 to be freely pivotable. This movability of pin 65 is necessary since when carrying out a zero adjustment of the pointer, this pin must also be able to follow the transverse movement of the spring arm 53 in the direction of the arrow 60. When carrying out an adjustment by tightening or retracting the setscrew 63, pin 65 will be either raised or lowered with the result that the effective length of the lever arm 19 between the points 17 and 20 and thus also the transmission ratio of the lever 18 on pressure cell 7 will be changed.

It is evident from the foregoing description that by means of the two setscrews 57 and 63 which both act upon the leaf spring 50 it is possible to effect a very accurate adjustment of the gauge and to carry out such an adjustment very easily and quickly.

Although my invention has been illustrated and described with reference to the preferred embodiment thereof, I wish to have it understood that it is in no way limited to the details of such embodiment but is capable of numerous modifications.

Having thus fully disclosed my invention, what I claim is:

1. In a liquid-level gauge having a housing, a pressure cell secured within said housing and having a movable wall, a tubular member connected to said pressure cell and extending through a wall of said housing and adapted to connect the inside of said pressure cell to an immersion tube extending into a container holding a liquid the level of which is to be measured, indicating means, and transmitting means within said housing for transmitting the movements of said wall of said pressure cell to said indicating means, the improvement wherein said transmitting means comprises a lever having two arms, means for pivotably connecting said lever at a point between said arms to said pressure cell, means for pivotably mounting the free end of a first of said arms on said housing, a rocker connected to said indicating means, means for pivotably mounting said rocker on said housing so as to be pivotable about its axis, means for pivotably connecting the second of said arms of said lever to said rocker so as to turn said rocker about said axis under the action of said lever, and a return spring connected to said rocker for returning the same to a position in accordance with the zero position of said indicating means.

2. A liquid-level gauge as defined in claim 1, wherein said indicating means comprises a pointer integrally secured to said rocker and extending at a right angle to the rocker axis.

3. A liquid level gauge as defined in claim 2, wherein said pointer is movable within a plane extending substantially parallel to the central axis of said pressure cell.

4. A liquid level gauge as defined in claim 1, wherein said rocker has a shape similar to a crankshaft having outer ends disposed within said rocker axis and two crank parts between said ends cranked in opposite directions, said means for pivotably connecting the second arm of said lever to said rocker being pivotably connected to one of said crank parts, and said return spring being connected to the other crank part.

5. A liquid level gauge as defined in claim 1, wherein said means for pivotably mounting said rocker consist of associated pivotable knife-edge bearing means on said rocker and fixed knife-edge bearing means on said housing.

6. A liquid-level gauge as defined in claim 4, wherein at least one of said fixed bearing means for said rocker comprises a bearing member having a recess therein into which the associated pivotable bearing means engage, the bottom of said recess forming an angular knife-edge bearing having two edge surfaces including an angle of less than 180° between them, said axis of said rocker being disposed within the apex of said angle and the lateral surfaces of said recess limiting the pivotability of said associated pivotable bearing means of said rocker.

7. A liquid level gauge as defined in claim 5, wherein at least one pair of said associated fixed and pivotable bearing means is designed so as substantially to prevent said rocker from moving in the direction of said axis.

8. A liquid-level gauge as defined in claim 5, wherein one pair of said associated fixed and pivotable bearing means is designed so as substantially to prevent said rocker from moving in the direction of its axis, while the two bearing means of the other pair are slidable relative to each other in the direction of said rocker axis.

9. A liquid level gauge as defined in claim 1, wherein said means for pivotably mounting said rocker and said lever on said housing, for pivotably connecting said lever and said rocker to each other, and for connecting said return spring to said rocker consist of knife-edge bearing means.

10. A liquid-level gauge as defined in claim 1, wherein said means for pivotably connecting the second arm of said lever to said rocker comprise a draw bar and knife-edge bearing means on each end of said draw bar, and associated knife-edge bearing means on said second arm of said lever and on said rocker engaging with said bearing means on the associated end of said draw bar.

11. A liquid-level gauge as defined in claim 1, wherein substantially all of said transmitting means including said rocker, said draw bar, said lever, and said knife-edge bearing and connecting means are composed of stamped sheet metal.

12. A liquid-level gauge as defined in claim 10, wherein said draw bar is provided with an aperture, the end of said aperture facing said lever having an angular shape, said second arm of said lever extending through said aperture and having a knife edge engaging into the apex of said angular end of said aperture.

13. A liquid level gauge as defined in claim 12, wherein said aperture in said draw bar is formed by stamping out a longitudinal tongue connected at its rear end to said draw bar, the other free end of said tongue being reduced in length, said tongue being adapted to be bent out of the plane of said draw bar so as to permit said second arm of said lever to be inserted into said aperture, whereupon said tongue is bent back into said plane so that the free shortened end of said tongue will then form an abutment for holding said second arm with said recess.

14. A liquid level gauge as defined in claim 1, wherein said means for pivotally connecting said lever to said pressure cell comprise a tappet secured to and movable with one wall of said cell, said tappet having a pointed end engaging upon said lever so as to permit said lever to pivot about said pointed end.

15. A liquid level gauge as defined in claim 1, wherein said means for pivotably connecting said lever to said pressure cell comprise a tappet secured at one end to and movable with one wall of said cell, and a pin extending coaxially to and secured to the free end of said tappet and projecting through a bore in said lever between said arms thereof, said free end of said tappet forming an annular flange having a substantially spherical surface on which said lever is pivotable in different directions.

16. A liquid level gauge as defined in claim 1, wherein said means for pivotably mounting the first of said arms of said lever on said housing comprise a bearing member connected to said housing, and means for adjusting said bearing member in the direction of the longitudinal axis of said lever for reducing the effective length of said first arm of said lever and in a direction transverse to said longitudinal axis for pivoing said lever to a different angle from its normal position relative to said pressure cell.

17. A liquid level gauge as defined in claim 16, wherein said bearing member has an aperture through which said first arm of said lever engages, said aperture having an edge forming a knife-edge bearing for said lever.

18. A liquid level gauge as defined in claim 16, wherein said bearing member is resilient and rigidly secured at one end to said housing, said adjusting means comprising two separate adjusting members adapted to act independently of each other upon said bearing member.

19. A liquid-level gauge as defined in claim 18, wherein said bearing member comprises a substantially U-shaped leaf spring, the end portion of a first arm of said spring being rigidly secured to said housing and the end portion of the second arm of said spring forming a knife-edge bearing for the first arm of said lever, said adjusting members comprising two setscrews in a wall of said housing, a first of said setscrews when turned being adapted to bend the first arm of said spring so as to shift the second arm of said spring in a direction substantially transverse to said lever, and a connecting member pivotably connected at one end to the second setscrew and at the other end to the second arm of said spring so that, when said second setscrew is turned, the end of said second arm of said spring will be moved by said connecting member substantially in the longitudinal direction of said lever.

20. A liquid-level gauge as defined in claim 19, wherein said connecting member comprises a pin pivotably connected at one end to said other setscrew and projecting with its other end through a bore in said second spring arm, and a flange having a substantially spherical annular surface on said pin near said other end thereof for pivotably supporting said second spring arm.

References Cited

UNITED STATES PATENTS

| 2,032,245 | 2/1936 | Wotring | 73—410 XR |
| 3,290,939 | 12/1966 | Beck et al. | 73—299 |

LOUIS R. PRINCE, *Primary Examiner.*

D. O. WOODIEL, *Assistant Examiner.*

U.S. Cl. X.R.

73—406, 410